United States Patent [19]

Holmes

[11] 4,364,230

[45] Dec. 21, 1982

[54] HYDROSTATIC TRANSMISSION OVERSPEED PREVENTION CIRCUIT

[75] Inventor: William K. Holmes, Rothschild, Wis.

[73] Assignee: J. I. Case Company, Racine, Wis.

[21] Appl. No.: 194,765

[22] Filed: Oct. 7, 1980

[51] Int. Cl.³ .................. F16H 39/46; F04B 49/02
[52] U.S. Cl. .................................. 60/444; 60/445; 60/452; 60/447; 417/217; 417/218
[58] Field of Search ............... 60/444, 452, 445, 447; 417/217, 218

[56] References Cited

U.S. PATENT DOCUMENTS

| | | | |
|---|---|---|---|
| 3,217,493 | 11/1965 | Kempson et al. | 60/444 X |
| 3,898,807 | 8/1975 | Habiger | 60/445 X |
| 4,189,921 | 2/1980 | Knapp | 60/452 X |
| 4,212,164 | 7/1980 | Young | 60/452 |
| 4,216,656 | 8/1980 | Hamma | 60/452 X |

FOREIGN PATENT DOCUMENTS 1013766 12/1965 United Kingdom ............... 60/445

Primary Examiner—George L. Walton
Attorney, Agent, or Firm—Dressler, Goldsmith, Shore, Sutker & Milnamow, Ltd.

[57] ABSTRACT

A hydraulic circuit is provided to prevent overspeeding the prime mover powering a hydrostatic transmission. The hydrostatic transmission includes a hydraulic motor fluidly coupled to a hydraulic pump. The hydraulic pump is driven by the prime mover and the hydraulic motor drives a rotational load. The hydraulic pump includes a swash plate tilted by a servomechanism. The servomechanism receives hydraulic fluid from a pump powered by the prime mover. A valve is operated to shut-off the hydraulic fluid to the servomechanism in the event that the pressure in either of the two conduits joining together the hydraulic pump and the hydraulic motor exceeds a pre-set maximum value or if the pressure in an auxiliary line exceeds the same pre-set maximum value or if the sum of the two pressures exceeds the pre-set maximum value. The pre-set maximum value is a variable quantity having its maximum value when the angle of tilt on a swash plate within the hydraulic pump is zero or when the plate is approximately perpendicular to the axis of rotation of the plate. It is proportional to the horsepower demanded from the prime mover. By shutting off the supply of hydraulic fluid to the servomechanism when the auxiliary pressure or any of the two pressures in the two lines coupling hydraulic motor with the hydraulic pump becomes excessive, the hydraulic pump is precluded from being operated to load the prime mover in such a matter that the prime mover and pump would accelerate to an overspeed condition. This circuit is superior to those devices which sense an engine overspeed condition and then react because this circuit prevents the overspeed condition from occurring in the first place.

13 Claims, 2 Drawing Figures

U.S. Patent
Dec. 21, 1982
4,364,230
FIG. 1
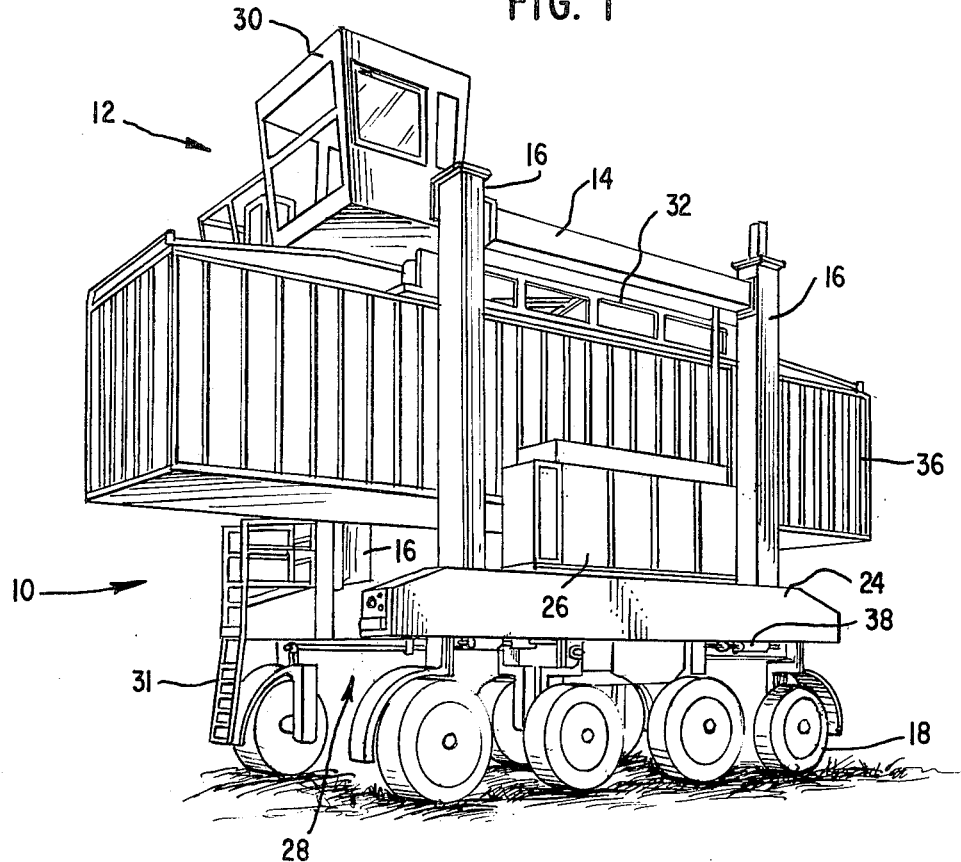
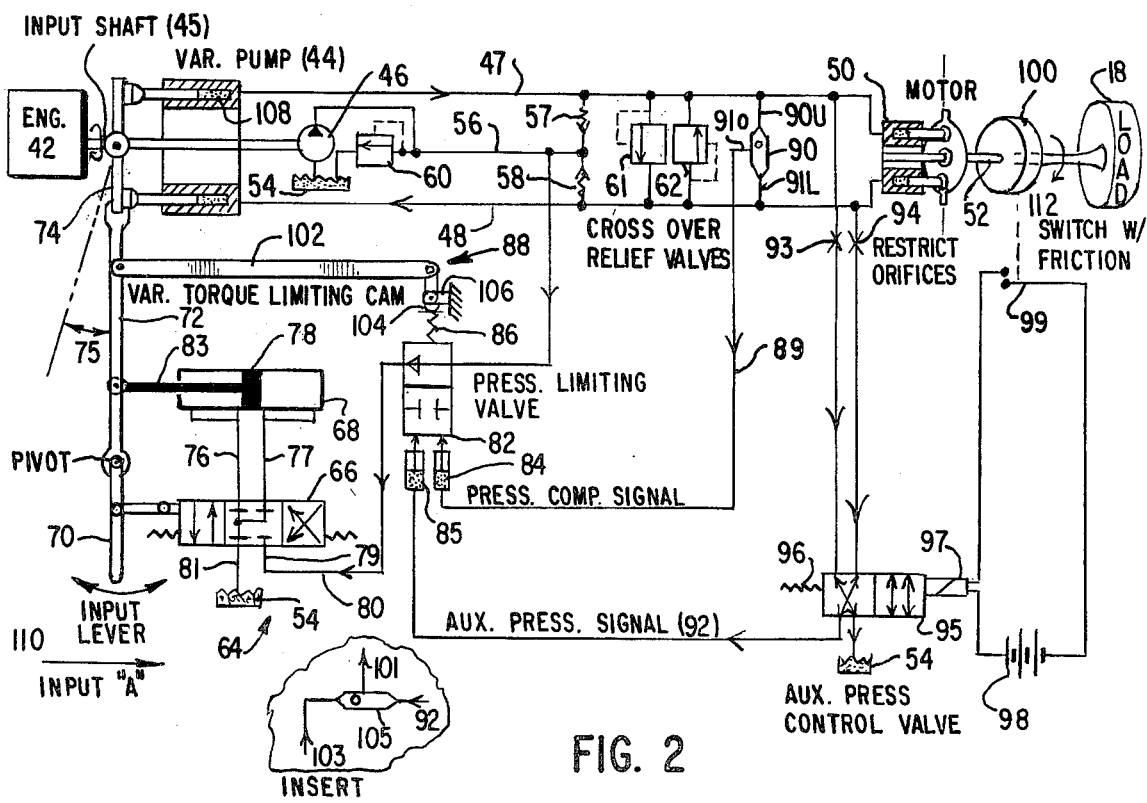
FIG. 2

HYDROSTATIC TRANSMISSION OVERSPEED PREVENTION CIRCUIT

TECHNICAL FIELD

This invention generally relates to closed loop hydraulic power transmission systems or hydrostatic transmissions. In particular, it is concerned with a unique hydraulic circuit that prevents overspeeding of the prime mover by automatically insuring that the hydraulic pressure available to decelerate an inertial load is lower than that pressure which was available to accelerate the load.

BACKGROUND OF THE INVENTION

In its simplest form, a hydraulic power drive or hydrostatic transmission consists of the following components:

(a) a prime mover, the source of power—a gasoline engine, electric motor, etc.

(b) a hydraulic pump, normally a variable displacement pump, which is driven by the prime mover and which produces a flow of pressurized hydraulic fluid;

(c) a hydraulic motor which is driven by the hydraulic pump;

(d) a means for controlling the direction of flow and magnitude of flow out of the pump; and (e) mechanical shafting and gearing to convey the output of the hydraulic motor to the load. The hydraulic pump is normally driven at a constant speed by the prime mover; if it is a variable displacement pump, it delivers hydraulic fluid at a variable rate to the hydraulic motor. Thus, by controlling the output of the hydraulic pump, the direction and speed of the hydraulic motor, and hence direction and speed of the load can be controlled.

In many hydraulic drive systems or hydrostatic transmissions, a mass or load is accelerated and brought to speed by pumping fluid in one direction from the hydraulic pump to the hydraulic motor and decelerated or braked by attempting to reverse the flow of fluid from the hydraulic pump to the hydraulic motor (e.g. dynamic braking). This method of controlling the acceleration and deceleration of an inertial load is convenient, stable, well-proven and precise. If the reversing feature of the hydraulic pump is used in an ordinary hydrostatic drive, the same hydraulic pressure is normally used to both accelerate and decelerate the load.

In the case of an axial piston hydraulic pump the amount of flow and the direction of flow is determined by the angle of the tilt plate or swash plate. These axial piston pumps are often referred to as variable delivery or variable displacement hydraulic pumps. When the swash plate is at right angles to the drive shaft (i.e. zero tilt) and the drive shaft is rotating, the pistons which pump the fluid do not reciprocate; therefore, no pumping action takes place. When the swash plate is tilted from the right angle position, the pistons reciprocate and hydraulic fluid is pumped. The design and operation of axial piston hydraulic motors is very similar to the design and operation of an axial piston hydraulic pump. It well known that some hydraulic pumps can be used as hydraulic motors with little or no modification.

The output speed and torque of a hydraulic motor depend upon the power input in terms of differential pressure and the rate of flow. The relationship between output speed vs. input volume and output torque vs. input differential pressure depends on displacement of the motor. In particular, the output torque is proportional to the input differential pressure and the flow rate and inversely proportional to the speed (RPM). This follows from the fact that in a prime mover hydraulic pump system combination, the torque of the input shaft is proportional to the hydraulic pressure and the flow through the system. Therefore, if system pressure is limited, shaft torque or input torque will also be limited, for a given pump displacement.

Fluid motors may be of the fixed displacement or variable displacement type. The fixed displacement provides constant torque and variable speed for a given differential pressure. The speed is varied by controlling the amount of input flow. The variable displacement motor is constructed in a manner which permits the working relationship of the internal parts to be varied so as to change the displacement. This provides variable torque and variable speed. With input flow and operating pressure remaining constant, the relationship between the torque and the speed can be varied to meet load requirements by varying the displacement. The majority of motors used in fluid power systems are the fixed displacement types. In most fluid power systems, the motor is required to provide actuation in either direction. This is, of course, achieved by changing the angle of the swash plate in the variable displacement hydraulic pump.

Because of the similarity in the operation and construction of the hydraulic pump and hydraulic motor, particularly a variable displacement hydraulic pump of the axial piston variety and an axial piston hydraulic motor, a hydraulic motor acts as a hydraulic pump when the hydraulic pump has its displacement reduced (by decreasing the angle of the swash plate) to a volume less than the volume passing through the motor and the load connected to the output shaft of the hydraulic motor is in motion. Effectively, the inertia of the load drives the hydraulic motor in such a way that it "pumps" hydraulic fluid.

However, most prime movers do not have a retarding torque characteristic equal to their driving torque characteristic. In other words, the prime mover accelerates a load at a different rate than it decelerates a load. Consequently, if a load in motion is decelerated by the application of decelerating pressure, the magnitude of which is equal to the pressure previously used to accelerate that load, the hydraulic pump and the associated prime mover can overspeed. Overspeeding the hydraulic pump or the prime mover can cause damage or excessive wear to either or both of the components. Thus, if overspeeding is to be avoided, a lower pressure should be used to decelerate the moving load. Although the rate of deceleration is reduced by using a lower hydraulic pressure, operationally this is of no significance since most machines also have mechanical brakes to slow or stop the moving load. These mechanical brakes are normally used in conjunction with the retarding feature of the variable displacement hydraulic pump.

SUMMARY OF THE INVENTION

In accordance with the present invention a hydraulic circuit is provided to prevent overspeeding of the prime mover and hydraulic pump of a closed loop hydrostatic transmission when the flow through the hydraulic pump is retarded to brake or decelerate a moving load connected to the hydraulic motor driven by the hydraulic pump. In the case of a variable displacement hydraulic pump whose swash plate or tilt plate is positioned by a hydraulic servomechanism, the hydraulic fluid used to operate the servomechanism is shut off if the hydraulic pressure in either of the two main conduits (i.e. the ones passing hydraulic fluid between the hydraulic pump and hydraulic motor of a closed loop hydrostatic transmission) exceeds a pre-set maximum value, or if the auxiliary hydraulic pressure exceeds the pre-set maximum value, or if the hydraulic pressure in either of the two conduits and the auxiliary hydraulic pressure when added together exceeds that same pre-set maximum value.

Pressure compensation is introduced into the servomechanism by comparing the pre-set maximum pressure value against the pressure in either of the two main conduits. The auxiliary hydraulic pressure signal is equal to the lowest value of pressure during acceleration and the highest during deceleration of the load. Alternatively, it can be viewed as the pressure in that conduit which, for a given direction of rotation of the hydraulic motor, would be at the higher pressure if the hydraulic pump were not operating and the hydraulic motor was rotating due to the rotational inertia of the load.

The pre-set maximum pressure value is a pressure which varies with the angle of tilt on the swash plate and hence the displacement or flow of the hydraulic pump. In particular, the pre-set maximum pressure decreases in value as the angle of tilt on the swash plate increases in value. Because the pre-set maximum pressure value decreases as the angle of tilt on the swash plate increases, the maximum pressure allowable in either of the two conduits decreases with increasing flow from the hydraulic pump. This introduces horsepower (or torque) compensation into the servomechanism.

Thus, the servomechanism, when compensated for the pressure (or torque loading) on the hydrostatic transmission, cannot be operated to overspeed the prime mover or the hydraulic pump powered by the prime mover. Other specific advantages and features of the invention will become readily apparent from the following detailed description of the invention, from the embodiment illustrated therein, from the claims, and from the accompanying drawings.

BRIEF DESCRIPTION OF THE DRAWINGS

FIG. 1 is a perspective view of a straddle carrier having the various features of the present invention incorporated therein; and FIG. 2 is a schematic representation of a closed loop hydrostatic transmission employing the overspeed prevention circuit that is the subject of the present invention.

DETAILED DESCRIPTION OF THE INVENTION

While this invention is susceptible of embodiment in many different forms, there is shown in the drawings and will herein be described in detail a preferred embodiment of the invention with the understanding that it is considered an exemplification of the principles of the invention and is not intended to limit the invention to that specific embodiment illustrated. The scope of the invention will be pointed out in the appended claims.

FIG. 1 shows a straddle carrier 10 which consists of a generally inverted U-frame 12 having an upper horizontal portion or bridge 14 and a pair of spaced legs 16 depending from opposite ends of the upper horizontal portion. Each pair of legs 16 is supported at its lower end by a plurality of wheels 18. The legs 16 are interconnected at their lower ends by a pair of elongated hollow beams 24. The upper ends of each pair of legs 16 are interconnected by transverse horizontal hollow columns (not shown). The legs when so positioned define an elongated open cargo-receiving bay 28.

The carrier also has an operator's compartment or cab 30 supported at one corner of the bridge 14. There the equipment attendant or driver manipulates the various controls used to operate the carrier 10. The cab is accessible through a ladder 31 attached to one of the forward or front legs 16. An engine compartment 26 is supported by one of the two hollow beams 24 at the lower ends of the legs 16. The engine contained therein drives a plurality of pumps that supply hydraulic fluid to a plurality of motors and actuators to operate various moving components and equipment. In particular, a spreader 32 is supported by the bridge 14 for vertical movement within the open bay 28 through a hoisting mechanism. The spreader is used to manipulate cargo containers or vans 36. The wheels 18 are steered by a plurality of fluid rams 38 through a linkage so that all of the wheels are turned in a synchronized relationship. The wheels 18 are driven by hydraulic drive motors which are in turn powered by the hydraulic pumps and the engine 42 within the engine compartment 26 through a hydraulic transmission means 40 (see FIG. 2). Additional details concerning the straddle carrier 10 referred to in FIG. 1 may be found in U.S. Pat. No. 4,119,229 to Holmes et al. and assigned to the assignee of the present invention. That patent, insofar as providing additional details describing the various relationships between the components of the present invention is herein incorporated by reference.

The major components of the hydraulic circuit used to operate or power the wheels 18 of the straddle carrier 10 will now be described. The hydraulic transmission means 40 used to drive the wheels 18 can take on a variety of forms. FIG. 2 is a schematic diagram illustrating one type of drive incorporating a closed loop hydrostatic transmission. An engine 42 such as a diesel engine or gasoline engine drives a variable displacement hydraulic pump 44 through an input or drive shaft 45. That same shaft drives a charging pump 46. A pair of main conduits or fluid lines 47 and 48 supplies hydraulic fluid from the pump 44 to a hydraulic motor 50. For convenience, one of the two main conduits 47 will be alternatively referred to as the "upper main conduit" and the other main conduit 48 will be referred to as the "lower main conduit". The hydraulic pump 44 is of the reversible flow variety so that pressurized fluid may be delivered to either of the two main conduits 47 and 48 to control the direction of rotation of the hydraulic motor 50 and the wheels 18. A hydraulic servomechanism 64 is used to control the speed and direction of rotation of the hydraulic pump 44. The wheels 18 are joined to the hydraulic motor 50 by an output shaft 52.

The charging pump is used to supply control oil or fluid to operate or power the servomechanism 64. The charging pump 46 is connected to a hydraulic fluid reservoir or sump 54. The charging pump 46 is a constant displacement pump delivering a constant supply of fluid to a header 56 which is connected to the two main conduits 47 and 48 through check valves 57 and 58 and to a pressure relief valve 60. Thus, pressurized fluid from the charging pump 46 is automatically added to the closed loop hydrostatic transmission including the variable displacement, reversible flow hydraulic pump 44, the two main conduits 47 and 48, and the hydraulic motor 50 whenever such fluid is necessary. For example, if the upper main conduit 47 is pressurized, by the hydraulic pump 44, the pressure of the fluid therein will always be greater than the relief valve setting of the charging pump relief valve 60 so as to maintain the upper check valve 57 in the closed or seated position. If the closed loop hydrostatic transmission is in need of additional fluid, the pressure in the lower conduit 48 will drop below the setting of the charging pump relief valve 60. This in turn opens the lower check valve 58 so as to supply charging oil to the lower main conduit 48.

The hydraulic transmission means 40 also incorporates a high pressure relief system for interconnecting the upper 47 and lower 48 main conduits any time there is a sudden surge of pressure of the fluid in either conduit. This is accomplished by connecting the upper and lower main conduits 47 and 48 by a pair of relief valves 61 and 62. One relief valve 61 protects the upper main conduit 47 from a sudden surge in pressure. The second relief valve 62 protects the lower main conduit 48 from a sudden increase in pressure. With the relief circuit just described, whenever the hydraulic pump 44 is suddenly shut down for any reason, the momentum of the carrier 10 can result in a rapid rise in pressure in either the upper 47 or the lower 48 conduits, (depending on the direction of motion of the carrier) which in turn will open the appropriate relief valve 61, 62 to provide a flow path bypassing the hydraulic pump 44. Other details concerning the specific components of the hydraulic transmission means 40 may be found in Holmes et al. U.S. Pat. No. 4,119,229 previously referenced.

The servomechanism 64 used to operate, control and adjust the hydraulic pump 44 will now be described. The servomechanism 64 is of the hydromechanical variety. It includes a control valve 66; a positioner or servocylinder 68; an input lever 70; and a drive link 72. The drive link 72 is joined to the swash plate or tilt plate 74 of hydraulic pump 44. The positioner 68 manipulates the drive link 72 to control the angle 75 of the swash plate 74. Position feedback between the control valve 66 and the swash plate 74 is obtained by linking the drive link 72 to the input lever 70. The input lever 70 controls the position of a spool within the control valve 66 and the flow path of hydraulic fluid to and from the positioner 68.

As shown in the drawings, control valve 66 is a three-position, four-way valve biased to the center position. The two output ports 76 and 77 of the control valve 66 are fluidly connected to both sides of the piston 78 within the positioner or servocylinder 68. The control valve 66 has two input ports 79 and 81. A supply of "control oil" is fed to one of the input ports 79 of the control valve 66 via a conduit 80 joined to a header 56 downstream of the charging pump 46. A pressure limiting valve 82 (to be described in detail at a later point in this discussion) controls the supply of hydraulic fluid flowing from the charging pump 46 to the control valve 66. The other input conduit 81 directs fluid displaced by the movement of the piston 78 within the positioner 68 to the reservoir 54. Thus, by operating the input lever 70 the control valve 66 can be positioned to supply fluid to either side of the piston 78 in the positioner 68 so as to force the piston rod 83 inwardly or outwardly thereby controlling the angle 75 of the swash plate 74 in the hydraulic pump 44. By pivotally linking together the drive link 72 with the input lever 70, the displacement of the swash plate and the movement of the drive link 72 is "fed back" to the input lever. These principles are conventional and well-known to those skilled in the art. Thus, so long as hydraulic fluid under pressure is provided to the control valve 66, the driver or machinery operator of straddle carrier 10 is free to manipulate the swash plate 74 and thereby control the operation of the variable displacement hydraulic pump 44. However, if the supply of hydraulic fluid to the control valve 66 is shut off, the swash plate 74 cannot be operated by manipulating the input lever 70. This is the function of the pressure limiting valve 82 which will now be described in detail.

As illustrated in the drawings, the pressure limiting valve 82 is a two-position, two-way spool valve biased to the open position by a spring 86 and actuated to the shut position by two parallel valve pilots 84 and 85. The spring 86 which biases the pressure limiting valve 82 to the open position, by virtue of an articulated linkage and cam mechanism 88, provides a variable biasing force tending to hold the valve in the open position. The various components controlling the pressure limiting valve 82 will now be described. Afterwards, the integrated operation of these various components will be discussed in detail.

One valve pilot 84 is joined to a conduit 89 providing hydraulic fluid from a shuttle valve 90. The shuttle valve has its two input ports 91U and 91L joined to the two main conduits 47 and 48 of the hydraulic transmission means 40. The output from the shuttle valve 90 is a "pressure signal" (i.e. a source of pressurized fluid) that is equal in pressure to the higher of the pressures in the two main conduits 47 and 48. Thus, when the upper conduit 47 is higher in pressure than the lower main conduit 48, the shuttle valve 90 provides at its output port 91o fluid, the pressure of which is equal to the pressure of the hydraulic fluid in the upper main conduit 47. When the hydraulic pump 44 is running at a constant speed (RPM) and pumping fluid to the upper main conduit 47 and from the lower main conduit 48, the pressure of the fluid in the higher of the two main conduits is proportional to the torque loading on the hydraulic motor. Moreover, the torque on the input shaft 45 and the engine 42 is proportional to this same hydraulic pressure. Effectively, by using this pressure to control operation of the pressure limiting valve 82, pressure compensation is introduced. This pressure signal (e.g. pressure at the output port 91o of the shuttle valve 90) will be referred to as the "pressure compensating signal."

The second valve pilot 85 is supplied with hydraulic fluid under pressure from a conduit 92 joined to either the upper 47 or the lower 48 main conduits through a restriction orifice 93, 94 and an auxiliary pressure control valve 95. As illustrated in the drawings the auxiliary pressure control valve 95 is a two-position, four-way valve that is biased to one position by a spring 96 and actuated to its second position by a solenoid 97. When the solenoid is de-energized hydraulic oil is ported through the auxiliary pressure control valve 95 in such a manner that fluid from the upper main conduit 47 flows through an orifice 93 to the hydraulic reservoir 54. The other path through the valve is from the lower main conduit 48 via an orifice 94 to the second valve pilot 85 on the pressure limiting valve 82. When the solenoid 97 is actuated, the flow of fluid through the valve 95 is reversed such that fluid from the upper main conduit 47 is directed to the second valve pilot 85 on the pressure limiting valve 82 while fluid from the lower main conduit 48 is ducted to the hydraulic reservoir 54.

The electrical circuit actuating the solenoid 97 on the auxiliary pressure control valve 95 will now be described. The electrical circuit is a series circuit that includes a battery 98 or other supply of voltage, a switch 99, and the solenoid 97. When the switch 99 is closed and power is available from the battery 98 the solenoid is actuated. The output or drive shaft 52 of the hydraulic motor 50 is provided with a change-in-direction sensing means 100 for actuating the switch 99 powering its solenoid 97.

There are many devices which can be used to actuate or cycle an electrical switch or pair of contacts whenever a shaft changes its direction of rotation. In one specific device, a pair of paddles is coaxially mounted inside a rotating cylinder of hydraulic fluid. The cylinder is keyed to rotate with the shaft whose direction is to be monitored. Viscous coupling between the inside walls of the cylinder and the paddles drives the paddle wheels in the same direction as the cylinder. By limiting the allowable angular displacement of the paddles between two angular limits, the paddles are rotated to one extreme when the cylinder is rotated in one direction and then rotated to the opposite extreme when the cylinder changes its direction of rotation. The movement of the shaft joining two paddles can then be used to operate an electrical switch or pair of contacts. Thus, whenever the direction of rotation in the output shaft 52 changes, the switch 99 changes its position which causes the auxiliary pressure control valve 95 to change its position.

The fluid flowing out of the auxiliary pressure control valve 95 is supplied to the second valve pilot 85. The pressure of the fluid flowing out of the auxiliary pressure control valve 95 can be thought of as a "pressure signal" or control signal which is representative of the pressure within that one of the upper and lower main conduits 47 and 48 which will be at the "lower" pressure of the two conduits during acceleration and at the "higher" pressure of the two conduits during deceleration of the load. This action is the result of the interaction of the auxiliary pressure control valve 95, the switch 99, and the pressure in the two conduits during acceleration and deceleration of the load.

Since the pressure limiting valve 82 is normally biased to the open position by a spring 86 and actuated to the shut position by either one or both of the two valve pilots 84 and 85, the pressure signals or pressure supplied to the two hydraulic pilots apply a total force which determines the position of the valve for a given spring force. The pressure limiting valve 82 will block flow to conduit 80 supplying hydraulic fluid to the control valve 66 if the pressure in either the upper 47 or lower 48 main conduit exceeds the spring force biasing the valve to the open position. Similarly, if the auxiliary pressure signal creates a force which exceeds the force of the biasing spring 86, the pressure limiting valve 82 shuts. Since the two valve pilots 84 and 85 work in parallel, the pressure limiting valve 82 also shuts if the sum of the two forces exceeds the force of the biasing spring 86.

The force of the biasing spring 86 tending to hold the pressure limiting valve 82 in the open position is a variable quantity dependent upon the angle 75 of the swash plate 74. Specifically, an articulated linkage and cam mechanism 88 determines the spring force of the biasing spring 86. The articulated linkage and cam mechanism 88 includes a throw rod 102 pivoted to a cam lever 104 which is pivoted about a fixed bracket 106. The throw rod 102 is adjusted so that when the swash plate 74 is at right angles to the drive or input shaft 45 (e.g. the pump is idle or not moving fluid between the two main conduits 47 and 48), the cam lever 104 compresses the biasing spring 88 to the maximum extent. Thus, when the swash plate 74 is at right angles to the input shaft 45, the biasing spring 86 provides the greatest force tending to hold the pressure limiting valve 82 in its open position. As the swash plate 74 is repositioned or tilted, the throw rod 102 operates the cam lever 104 so as to reduce the force of the biasing spring 86, such that, when the swash plate 74 is displaced to its maximum extent, the biasing spring 86 provides the least force tending to hold the pressure limiting valve 82 open. Since the displacement of the individual pistons 108 increases as the angle 75 on the swash plate 74, and since torque is proportional to this displacement for a constant pressure output and input RPM, the horsepower output from the hydraulic pump 44 is proportional to the angle 75 of the swash plate 74. Since the force of the biasing spring 86 is linked to the angle of the swash plate 74, the pressure limiting valve 82 is said to be horsepower limited in the sense that, as the horsepower increases, less spring pressure is available to hold the valve open.

The integrated operation of the hydraulic transmission means 40 and, in particular, the pressure limiting valve 82 will now be described. If the input lever 70 of the servomechanism 64 is driven to the right (see arrow 110), the swash plate 74 is rotated clockwise due to the extension of the servocylinder 68. With the swash plate so positioned, the hydraulic pump 44 forces fluid into the upper main conduit 47 to the hydraulic motor 50 which rotates the load or wheels 18 (in the direction shown in FIG. 2—arrow 112). To overcome the inertia of the load 18, the pressure in the upper conduit 47 increases due to the resistance of flow. Without loss of generality, it can also be assumed that the change in direction sensing means 100, when rotating in this direction (arrow 112), holds the switch 99 open. With the switch opened, the solenoid 97 is deenergized and the auxiliary pressure control valve 95 is held in that position determined by its biasing spring 96. In that position, hydraulic fluid from the upper main conduit (relatively high pressure) 47 is dumped to the hydraulic reservoir 54 and fluid from the lower main conduit (relatively low pressure) 48 is directed to the second valve pilot 85. Thus, when the second valve pilot is exposed to the "lower" of the pressures in the main conduits 47 and 48, very little effect is realized; when exposed to the "higher" of the two pressures, the system pressure is greatly affected. In addition, since the upper main conduit 47 is at a higher pressure than the lower main conduit 48, the shuttle valve 90 directs high pressure fluid from the upper main conduit to the first valve pilot 84 in the pressure limiting valve 82. Assuming that the swash plate 74 has been tilted to its maximum value, the actuating linkage and cam mechanism 88 is repositioned in such a manner that the biasing spring 86 on the pressure limiting valve 82 provides the least force tending to hold the pressure limiting valve open. As long as the load resistance does not cause a pressure higher than the spring force in the pressure limiting valve, no limitations on the servomechanism 64 or the hydraulic pump 44 will occur.

Now, assuming the load has been brought up to speed such that it is no longer accelerating, if the input lever 70 of the servomechanism 64 is returned toward its center position or reverse position such that the swash plate 74 is directed to return to a position of less displacement, then the engine 42 begins to unload and its speed begins to increase. It generally does not absorb torque at the same magnitude at which it can generate torque. In addition, the biasing spring 86 now applies a greater force to hold the pressure limiting valve 82 open in proportion to the magnitude of the reduced angle of the swash plate. However, because the load 18 continues to move due to inertia, the hydraulic motor 50 functions as if it were a "pump" in the closed loop hydrostatic transmission means 40. This increases the pressure of the fluid in the lower main conduit 48 since fluid is "pumped" from the upper main conduit 47 to the lower main conduit. The shuttle valve 90 shifts from the upper main conduit 47 to the lower main conduit 48. Moreover, since the auxiliary pressure control valve 95 still remains in its deenergized position, the high pressure fluid in the lower main conduit 48 (due to motor pumping into a resistance at the pump) is ported to the second valve pilot 85. Thus, the spool within the pressure limiting valve 82 has two high pressure signals applied to it. This is enough force to overcome the biasing spring 86 and shut the valve. When the valve goes shut, the servomechanism 64 is disabled. It can not follow the input to manipulate the swash plate 74 of the hydraulic pump 44 to a lesser displacement until the intertial load diminishes and pressure in the lower conduit drops below the setting of the pressure limiting valve 82. This is necessary to protect the engine from overspeeding which would occur if one were to rapidly absorb the inertial load into the engine.

Now, if the input lever 70 could be operated to drive the moving load 18 in the reverse direction (opposite of arrow 112 in FIG. 2) the lower main conduit 48 would be pressurized by the pump 44. Since the lower main conduit 48 is already pressurized by the rotating motor 50 and since the auxiliary pressure control valve 95 is lined up to port hydraulic fluid from the lower main conduit 48, two high pressure signals would be applied to the two valve pilots 84 and 85. Even if it is assumed that the inertial load 18 started to diminish, the forces tending to shut the pressure limiting valve 82 coupled with the decrease in the force of the biasing spring 86 due to the increased angle of tilt on the swash plate 74 (brought about by moving the input lever 70) is enough to keep the pressure limiting valve 82 shut. Without "control oil" being supplied to the servomechanism 64, manipulation of the swash plate 74 is precluded. As long as these high pressure conditions exist in lower main conduit 48 (with the inertial load continuing), the pump displacement cannot be further reduced by motion of the input lever. The application of the two valve pilots 84 and 85 reduces the pressure compensation to a level about one-half the magnitude of acceleration pressure compensation with only one pilot 84. Thus, since deceleration pressure is about one-half of acceleration pressure, overspeeding of the hydraulic pump 44 or the engine 42 has been effectively prevented. The servomechanism will remain disabled until the force due to the sum of the two pressure signals applied to the two valve pilots 84 and 85 and is less than the force applied by the biasing spring 86.

However, once the direction of the load 18 changes (reverse of arrow 112 in FIG. 2), the change-in-direction sensing means 100 is activated. This closes the switch 99 and energizes the solenoid 97 on the auxiliary pressure control valve 95. Once the auxiliary pressure control valve 95 changes position, the fluid from the lower main conduit 48 is diverted to the reservoir 54 through the associated restriction orifice 94. Fluid from the upper main conduit 47 is then directed to the second valve pilot 85. Since the lower main conduit 48 is now pressurized by the hydraulic pump 44 in forcing the hydraulic motor 44 to rotate the inertial load 18 in the reverse direction (opposite to arrow 112), and since the "pumping effect" of the motor has ceased (e.g. it no longer rotates by the inertia of the load since it has been completely decelerated in the original direction), the hydraulic pressure signal to the second valve pilot 85 of the pressure limiting valve 82 is the lower of the two conduit pressures (just as in the case when the auxiliary pressure control valve 95 was deenergized and the load was rotated in the original direction (arrow 112) by the action of the pump alone). Under these circumstances, the biasing spring 86 overcomes the two valve pilots 84 and 85, and the pressure limiting valve 82 is open. Control oil is then available to move the swash plate 74 through its full range to fully load the engine 42. There is no danger now of overspeeding the engine or the pump since no inertial load is being transmitted to the engine. Thus, a means to control inertial load deceleration pressure to a value less than the acceleration pressure of the hydrostatic transmission has been described which compensates for the inherent inability of the prime mover to absorb as much horsepower as it produces without overspeeding the prime mover and the associated hydraulic pump.

The automatic deceleration pressure control concept just described while illustrated in connection with a hydrostatic transmission is equally applicable to many other variable volume pumps used with or in connection with various other hydraulic circuits. For example the servomechanism 64 can be of the electromechanical variety and the pressure limiting valve can be replaced with a hydraulically actuated switch. In addition, the servo control valve 66 can be provided with the biasing spring 86 and the two valve pilots 84 and 85 to directly interlock the operation of the servocylinder 68.

As illustrated in the drawings a pressure-compensated, horsepower-limited control circuit was described. The same system will operate as a pressure-compensated control circuit if the articulated linkage and cam mechanism 88 is removed and the biasing spring 86 is arranged to provide a constant force tending to hold the pressure limiting valve 82 open.

As another modification, a shuttle valve 105 (See insert for FIG. 2) can be installed between the auxiliary pressure control valve 95 and the pressure limiting valve 82. If one input port 103 of the shuttle valve 105 is joined to a fluid component driven by the same engine 42, such as another hydraulic pump, the fluid pressure of that component will be indicative of the load on the engine. The output 101 of the shuttle valve will then be a pressure signal equal to the higher of the two input fluids. Therefore, the same pressure limiting valve can be used to protect the engine and the engine driven pumps from a potential overspeed condition due to the inertial effects of either pump, as well as limiting the total horsepower demand from the prime mover.

Thus, while the invention has been described and shown with particular reference to one embodiment and one application, it will be readily apparent that other variations are possible which would fall within the spirit of the present invention and that the invention is not to be limited, except by the scope of the appended claims.

What is claimed is as follows:

1. In a material handling machine having: a closed loop hydrostatic power transmission system driven by a prime mover to move a load using a hydraulic motor and a variable displacement hydraulic pump fluidly coupled together by two fluid conduits; a charging system to make up fluid lost by leakage from said transmission; a reservoir to collect leakage and to supply fluid to said charging system; and a servomechanism, powered by fluid supplied from said charging system through a pipe to control the quantity and direction of flow from said pump to said motor by tilting a swash plate in said pump, a hydraulic circuit to prevent overspeeding the prime mover driving said pump, comprising:

(a) a shut-off valve in said pipe for establishing flow between the charging system and the servomechanism, said valve including a biasing means for normally urging said valve to its open position;

(b) operating means, linked to said shut-off valve, for closing said shut-off valve to control the operation of said servomechanism in response to the direction of rotation of said motor, and the pressure of the fluid in said conduits, said operating means including:

first pilot means, opposing said biasing means, for closing said shut-off valve in response to the pressure of the fluid in that one of said two fluid conduits supplying fluid between the hydraulic pump and the hydraulic motor which is at the higher pressure, said biasing means being overcome by said first pilot means in the event that the pressure in said one conduit is due to a heavily loaded pump; and second pilot means, opposing said biasing means and in parallel with said first pilot means, for closing said shut-off valve in response to the pressure in that main conduit which for a given direction of rotation of said motor would be pressurized by said motor due to the rotational inertia of said load, said biasing means being overcome by said second pilot means in the event that the pressure in said main conduit is due to reducing the angle of the swash plate in the pump and an inertially powered motor functioning as a pump, whereby the acceleration of the prime mover induced by the rotation of the swash plate by said servomechanism is limited by the torque or pressure loading on said pump and the direction that said motor rotates;

(c) direction sensing means for sensing the direction of rotation of said motor and controlling said second pilot means; and (d) control valve means responsive to said direction sensing means for transmitting pressure from a selected main conduit to said second pilot means.

2. The hydraulic circuit set forth in claim 1, wherein said servomechanism includes: a four-way, three-position hydraulic control valve, said hydraulic control valve being supplied hydraulic fluid from said charging system via said shut-off valve and said pipe; and a hydraulic actuator operated by said control valve and operationally connected to said swash plate.

3. The hydraulic circuit set forth in claim 1, further including a shuttle valve having its two inlet ports joined to the two conduits passing fluid between said hydraulic pump and said hydraulic motor, whereby the outlet of said shuttle valve is fluid at a pressure equal to the higher of the two pressures in said main conduits, said first pilot means operating in response to the pressure of the fluid at the outlet of said shuttle valve.

4. The hydraulic circuit set forth in claim 1, wherein said shut-off valve is a two-position, two-way valve biased to the open position by said biasing means, said biasing means comprising a spring the compressed length of which is varied in response to the angle of tilt on said swash plate within said hydraulic pump, said spring being compressed to its greatest extent when the angle of tilt on said swash plate is zero.

5. The hydraulic circuit set forth in claim 4, wherein said shut-off valve is a spool valve and said spring is juxtaposed between one end of the spool within said spool valve and a camming surface the distance of which from said one end of said spool is proportional to the angle of tilt on said swash plate, said camming surface being closest to said one end when the angle of tilt on said swash plate is zero.

6. The hydraulic circuit set forth in claim 1, wherein said control valve means comprises a two-position, four-way valve biased to its first position and actuated to its second position by a solenoid operator, one outlet port being joined to said reservoir and the other outlet port being joined to said second pilot means, one inlet port being joined to one of the two hydraulic conduits joining said hydraulic pump to said hydraulic motor through an orificed connection, the second inlet port being joined to the other of the two conduits through an orificed connection, said solenoid operator being energized in response to said direction sensing means, joined to the output shaft of said hydraulic motor, for sensing a change in the direction of rotation of said load, whereby one of said two main hydraulic conduits is joined to said second pilot means when the output shaft is rotated in the clockwise direction and the other of the two main hydraulic conduits is joined to said second pilot valve means when the output shaft rotates in the counterclockwise direction, said second pilot means thereby being responsive to the direction that said motor rotates and the pressure produced in said conduits by the rotation of said motor when the angle of tilt on said pump swash plate is reduced.

7. The hydraulic circuit set forth in claim 1, wherein said first pilot means and said second pilot means are fluid rams powered by the fluid supplied from said two conduits.

8. The hydraulic circuit set forth in claim 1, wherein said biasing means is a spring, whereby said servomechanism is compensated for the pressure characteristic of said pump.

9. The hydraulic circuit set forth in claim 1, wherein said biasing means is a spring whose output force decreases as the flow out of said pump increases, said biasing means providing the greatest force when said swash plate is at right angles to the drive shaft of said pump such that said pump effectively ceases to force fluid therethrough, whereby said servomechanism is pressure and horsepower compensated.

10. In a material handling machine having a closed loop hydrostatic power transmission system driven by a prime mover to move a load using a hydraulic motor and a variable displacement hydraulic pump coupled together by two fluid conduits; a reservoir to collect leakage and to store fluid for use by the transmission system; and a servomechanism to regulate the quantity and direction of flow from the hydraulic pump by changing the angle of tilt on a swash plate within said hydraulic pump, a hydraulic circuit to prevent overspeeding the prime mover when decelerating the inertial load, comprising:

(a) a fluid charging system connected to said reservoir for operating said servomechanism; and (b) pressure limiting valve means operationally associated with said fluid charging system, for de-energizing said servomechanism to limit the operation of said swash plate in response to the pressure in said main conduits and the direction of rotation of said motor, said pressure limiting valve means including:

reference means for producing a pre-set maximum pressure value, said pre-set maximum pressure value being representative of the maximum allowable output torque or pressure loading from said pump; and first and second parallel valve pilots associated with said pressure limiting valve means for comparing said pre-set maximum pressure value against the pressure in each of said two conduits and for de-energizing said fluid charging system in the event that the pressure in either of said two conduits is greater than said pre-set maximum pressure value, or if the sum of the pressures in said two conduits is greater than said pre-set maximum pressure value, whereby said prime mover is precluded from being loaded by the operation of said servomechanism to decelerate the motion of said load in the event that the pressure in said conduits produced by the rotation of said hydraulic motor due to the moving inertia of said load with said hydraulic pump unloaded is greater than said pre-set maximum pressure value or in the event that the pressure in said conduits produced by said hydraulic pump and said hydraulic motor due to the rotational inertia of said load taken together is greater than said pre-set maximum pressure value.

11. The hydraulic circuit set forth in claim 10, wherein said reference means comprises variable spring bias means operationally associated with said swash plate and pressure limiting valve means, and said pre-set maximum pressure value decreases in value as the angle on said swash plate increases whereby the operation of said servomechanism is compensated for the pressure characteristic of said pump and the horsepower loading on said pump.

12. The hydraulic circuit set forth in claim 10, wherein said pressure limiting valve means comprises a pilot actuated spool valve biased to the open position, said spool valve being located in a pipe joining said charging system and said hydraulic servomechanism.

13. In a material handling machine having: a closed loop hydrostatic power transmission system driven by a prime mover to rotate a load using a hydraulic motor and a variable displacement hydraulic pump fluidly coupled together by two fluid conduits; a charging system to make up fluid lost by leakage from said transmission; a reservoir to collect leakage and to supply fluid to said charging system; and a servomechanism, powered by fluid supplied from said charging system through a pipe, for controlling the quantity and direction of flow from said pump to said motor, a hydraulic circuit to prevent overspeeding the prime mover driving said pump, comprising:

(a) a valve in said pipe, for supply of hydraulic fluid from said charging system to actuate said servomechanism;

(b) operating means, operationally associated with said valve and powered by the fluid in said conduits, for opening and closing said valve to control the supply of fluid to said servomechanism in response to the direction of rotation of said motor and the pressure in said conduits, said operating means including:

biasing means for urging said valve to the open position;

first pilot actuator means, opposing said biasing means, for closing said valve, said first pilot actuator means being supplied with fluid from that one of said two fluid conduits which is at the higher pressure; and second pilot actuator means, opposing said biasing means and in parallel with said first pilot actuator means, for closing said valve, said second pilot actuator means being supplied with fluid from that conduit which, for a given direction of rotation of said motor, would be at the lower pressure if said pump were used to accelerate the load in said given direction, whereby the speed of the prime mover induced by the operation of said servomechanism is limited by the torque or pressure loading on said pump and the direction that said motor is rotating;

(c) direction sensing means for sensing the direction of rotation of said motor and controlling said second pilot actuator means; and (d) control valve means responsive to said direction sensing means for transmitting pressure from a selected conduit to said second pilot actuator means.

* * * * *